United States Patent
Stufflebeam et al.

[19]

[11] Patent Number: 5,974,988
[45] Date of Patent: Nov. 2, 1999

[54] SEED METERING APPARATUS SEED TUBE

[75] Inventors: John F. Stufflebeam, Romeoville; Lisle J. Dunham, Downers Grove; Thomas A. Olson, Bolingbrook, all of Ill.

[73] Assignee: Case Corporation, Racine, Wis.

[21] Appl. No.: 08/581,444

[22] Filed: Dec. 29, 1995

[51] Int. Cl.⁶ .................................................. A01C 7/04
[52] U.S. Cl. ........................................ 111/185; 111/200
[58] Field of Search .................................. 111/174, 170, 111/183, 184, 185, 200

[56] References Cited

U.S. PATENT DOCUMENTS

| | | | |
|---|---|---|---|
| 312,594 | 2/1885 | Williams | 111/170 X |
| 912,431 | 2/1909 | Smith | 111/170 X |
| 3,796,346 | 3/1974 | Ribouleau | 111/185 X |
| 4,399,757 | 8/1983 | Maury | 111/185 X |
| 4,493,272 | 1/1985 | Rouhotas, Sr. | 111/185 X |
| 5,392,707 | 2/1995 | Romans | 111/185 |

FOREIGN PATENT DOCUMENTS

| | | | |
|---|---|---|---|
| 0536543 | 4/1993 | European Pat. Off. | 111/174 |
| 1045834 | 10/1983 | U.S.S.R. | 111/185 |
| 802899 | 10/1958 | United Kingdom | 111/185 |

*Primary Examiner*—Terry Lee Melius
*Assistant Examiner*—Christopher J. Novosad
*Attorney, Agent, or Firm*—Daniel Hulseberg; Mayer Brown & Platt

[57] ABSTRACT

A seed tube for an agricultural implement having a seed metering mechanism for uniformly dispensing seeds. The seed tube defines an enclosed curvilinear seed passageway extending between opposite ends of the tube. To promote control over the seeds gravitationally passing through the tube, the seed passageway has a smooth but decreasing cross-sectional configuration between ingress and egress ends of the passageway. The interior surface of the passageway and preferably the tube itself is formed from a material having a coefficient of surface friction ranging between about 0.02 and about 0.10. The enclosed seed passageway furthermore includes a narrowed front edge extending upwardly from a lower end of, the tube and for a majority of the length of the passageway. The narrowed front edge passes beneath and across, in a fore-and-aft direction, the entire ingress end of the passageway for enhancing control over and such that the individual seeds passing through the passageway have substantially equivalent time therein thus promoting equidistant spacings between seed plantings.

11 Claims, 4 Drawing Sheets

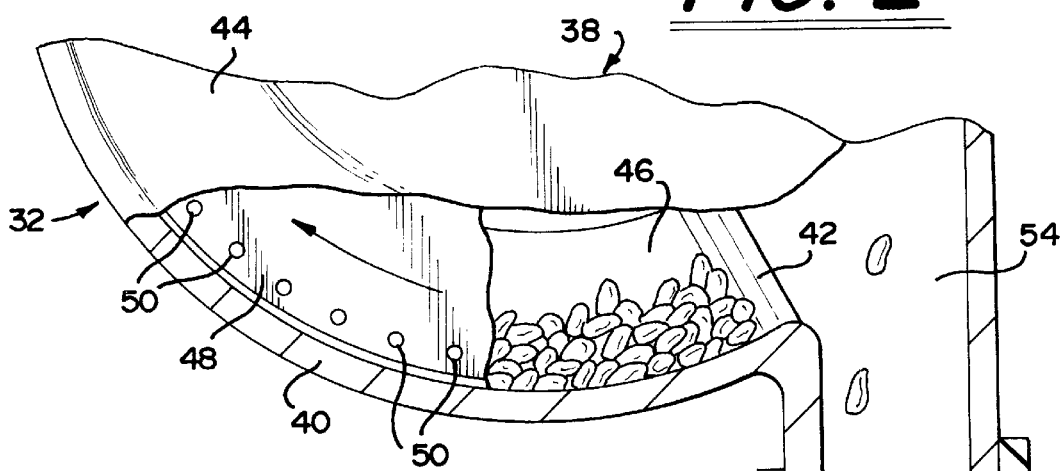
FIG. 2
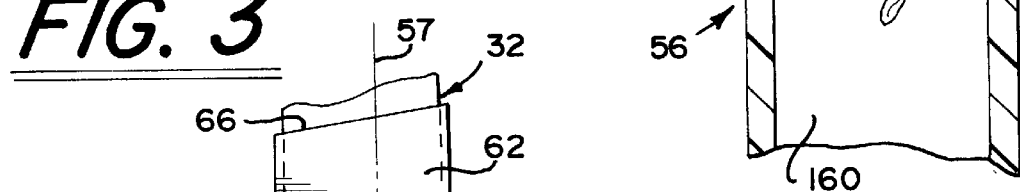
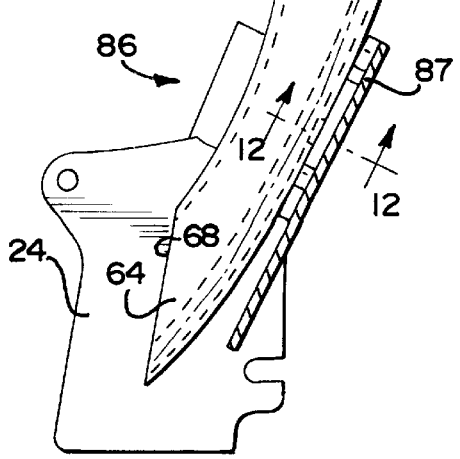
FIG. 3
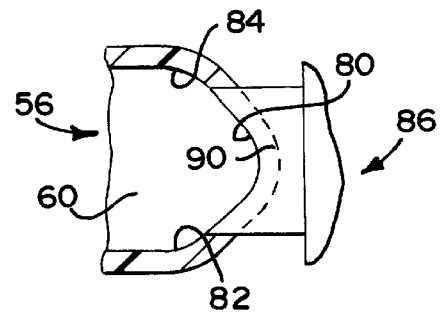
FIG. 12
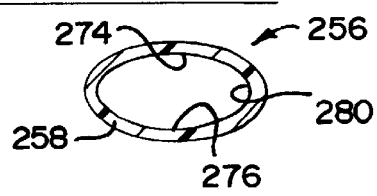
FIG. 20

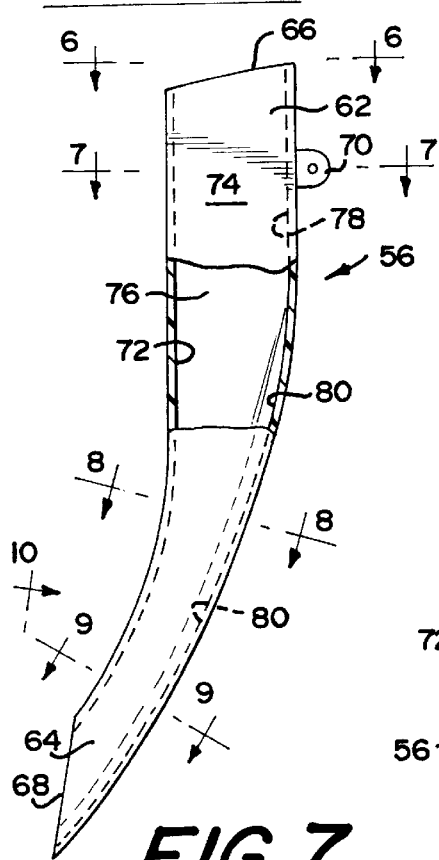
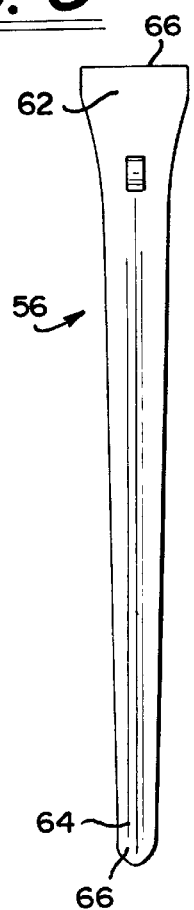
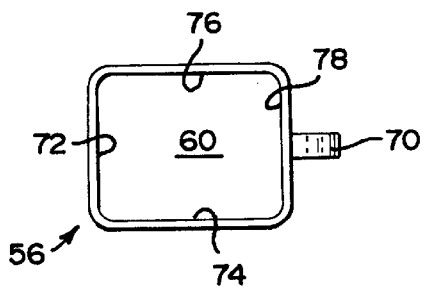
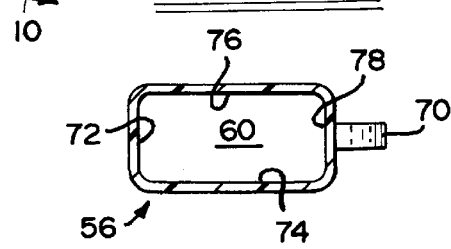
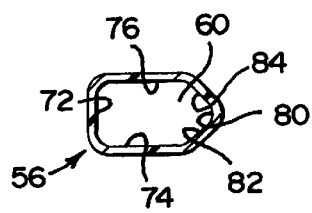
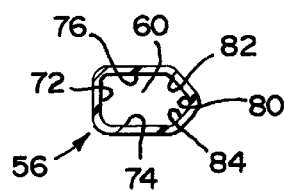
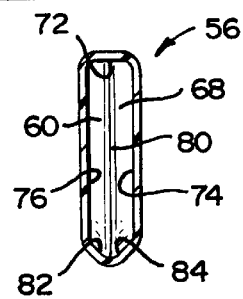
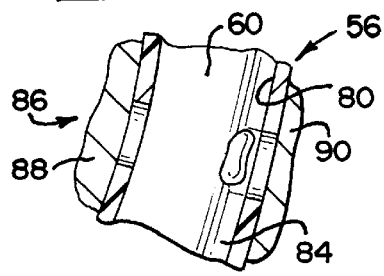

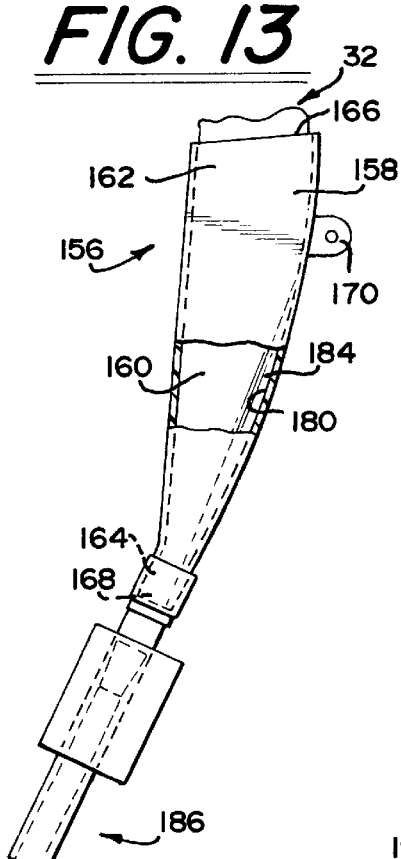

SEED METERING APPARATUS SEED TUBE

FIELD OF THE INVENTION

The present invention generally relates to agricultural implements having mechanisms for metering seed delivery at a controlled rate to the ground over which the implement is drawn and, more particularly, to a seed tube for directing seeds from the seed delivery mechanism for gravitational deposit on the ground.

BACKGROUND OF THE INVENTION

Agricultural implements such as planters and grain drills typically include mechanisms which meter or dispense individual seeds to the ground. As the implement is drawn across a field, seeds are preferably deposited into furrows in the ground. As will be appreciated by those skilled in the art, the seeds which are planted vary in size, weight and shape depending upon the particular planting.

Various types of seed metering mechanisms are known in the art. Some seed metering mechanisms are a mechanical type wherein individual seeds are picked from a seed mass and discharged to the ground for deposit within the furrows by mechanical devices. Other seed metering mechanisms utilize an apertured rotating disk that operates under the influence of air pressure differentials. Other metering mechanisms rely on a rotating drum that picks up seed from a seed mass and delivers the seeds through elongated air conduits for deposit within the furrows.

Regardless of the type of seed metering mechanism used, it is desirable to deposit a given quantity of seeds within a furrow over a predetermined distance. Also, it is important that the seeds be delivered to the ground in such a way that adjacent seeds within a furrow are generally equidistantly spaced relative to each other along the length of the furrow. To properly deposit the seeds within the furrow requires not only that the seeds be periodically dispensed from the metering apparatus in generally uniform relation relative to each other, but also that the seeds are directed toward and deposited into the furrow with minimal disturbance being imparted to the seeds as they pass from the seed metering mechanism to the ground.

In one form, the seed metering mechanism is typically arranged in combination with a seed hopper that is carried by the agricultural implement and moves along therewith at some nominal speed. It is known to mount a series of seed hoppers in side-by-side relation with each other with each seed hopper having its own seed metering mechanism for controlling the discharge of seeds to the ground as the implement is pulled there across.

Proper deposit of the seed into the furrow promotes planting, growing, and subsequent harvesting procedures. If the individual seeds are released from a housing of the seed meter for essentially vertical straight down movement into the furrow below under the effects of gravity, the ability to positively control the seed deposit is lost. Because the seed meter mechanism is not positioned immediately adjacent to the ground surface, the seeds discharged would normally establish a vertical velocity before they strike the ground.

Moreover, and because of the movement of the seed metering mechanism with the implement, the individual seeds exhausted from the housing of the seed metering mechanism likewise have a horizontal component of movement. The furrow openings wherein the seeds are to be deposited are created in soil and cannot be exact. Thus, the vertical and horizontal velocity components of the seeds discharged from the seed metering mechanism frequently cause the seeds to bounce upon engagement with the soil and away from the intended landing area, resulting in inaccurate and nonuniform distribution of the seeds within the furrow.

To better control the individual seeds as they are discharged from the housing of the seed metering mechanism, it is known to use a seed tube depending from a seed discharge area of the seed metering mechanism and extending toward the ground. These known seed tubes have an upper portion with a relatively straight configuration in the seed discharge area of the seed metering mechanism to provide a relatively smooth reception of the seeds into the tube. Such tubes are also known to include a curvature along a lower portion of the tube. The curved configuration at the lower portion of the tube serves a dual purpose. First, the configuration of the tube is curved a sufficient amount relative to the upper portion of the tube to control the vertical velocity component of the seed as it gravitationally moves toward a discharge end of the tube. Second, the curved configuration of the lower portion of the seed tube is such that it minimizes or eliminates the horizonal velocity component of the seeds as they are discharged to the ground. It is known to configure the lower portion of the tube with a vertically curved configuration in a direction opposite to the normal direction of the implement across a field. The seeds are thereby caused to exit from the seed tube with the horizontal velocity component of the seeds being generally equal to and opposite the horizontal velocity of the implement over the ground.

While such configured or curved tubes have proven effective in controlling the vertical velocity component of the seeds as they move through the tube while minimizing or eliminating the horizontal velocity component of the seeds moving through the tubes, such seed tubes have been known to introduce problems of their own which detract from the advantages obtained through their use in combination with seed metering mechanisms. A significant problem involving such seed tube relates to the inherent tendency for the seeds to rattle or bounce as they move through the tube. The vibrations inherent with the seed tube as it moves across the field exacerbates the seed deflection and delivery problems. Moreover, and because the seeds exhausted from the housing of the seed metering mechanism are of different sizes and shapes, each seed will have a different surface friction contact which tends to slow, delay and alter seed travel as it moves between upper and lower ends of the seed tube. As a result of such bouncing and frictional engagement with the tubes the seeds tend to exit the seed tube at different times and in unpredictable manners As will be appreciated, the inability to maintain substantially equidistance spacing between the seeds as they travel through the tube while likewise losing the ability to maintain substantially constant or uniform discharge of the seeds from the tube, results in nonuniform seed spacings within the furrow.

Thus, there is a need and a desire for a seed tube which is adapted to receive seeds from a seed metering mechanism and which is capable of controlling gravitational movement of the seeds by minimizing surface friction and seed bouncing as the seeds move along a predetermined pathway thereby enhancing controlled delivery of the seeds to the ground.

SUMMARY OF THE INVENTION

In view of the above, and in accordance with the present invention, there is provided a seed tube including a hollow member defining an enclosed and vertically curved seed pathway extending lengthwise between upper and lower ends of the hollow member. The pathway is defined by a narrowed front edge extending upwardly from the lower end of the seed tube and along the majority length of the hollow member with surfaces angularly diverging rearwardly in opposite directions from the forward edge toward a rear surface. The angularly diverging surfaces of the seed tube extend from the front edge in opposite directions and tend to positively direct the seeds moving along the pathway toward the narrowed front edge and limit the area in which the seeds can bounce thereby facilitating their equidistance spacing relative to each other and enhancing delivery of the seeds to the ground The majority of the length of the interior surface defining the seed pathway has a coefficient of surface friction ranging between about 0.02 and about 0.10. This low surface friction further serves to eliminate increases in spacing between the seeds resulting from seed contact regardless of the seed size and shape. In a most preferred form of the invention, the tube is formed from a molybdenum disulfide filled nylon material or the like material having a coefficient of surface friction with the characteristics described above.

Preferably, the enclosed seed pathway defined by said tube has a funnel-like configuration between upper and lower ends thereof. That is, the seed pathway has a larger cross section toward the upper end of the member than toward the lower end so as to promote uninhibited reception of seeds within the tube.

In a preferred embodiment of the invention, the angularly diverging surfaces extending rearwardly from the front edge form a "V" shaped configuration defining an included angle, ranging between about 60° and about 135°, between the angularly diverging surfaces. As will be appreciated, any angle suitable to promote positive displacement of the seeds toward the front edge as the seeds gravitationally move along the pathway will suffice. Moreover, the front edge extends along the majority of the internal surface and is configured with a curvature having a radius ranging between about 0.062 inches and about 0.562 inches. The curvature of the front edge extends outwardly away from the seed pathway and into planes of the diverging and angularly disposed surfaces extending rearwardly from the front edge.

In one embodiment of the invention, the seed tube is arranged in combination with a seed metering apparatus comprising a housing mounted to be moved over ground in a predetermined direction and having a hollow interior configuration defining a hopper area wherein seeds are held The seed metering apparatus further includes a rotary and apertured disk mounted within the hollow interior of the housing for conveying seeds of the housing for conveying seeds from the hopper to a seed discharge area under the influence of pressure differentials acting on the disk. The pressure differentials acting on the disk are blocked in the region of the seed discharge area such that seeds are periodically released from the disk within the seed discharge area of the housing for deposit to the ground. The upper end of the seed tube is arranged in seed receiving relation relative to the seed discharge area of the housing.

As mentioned above, the interior seed pathway defined by the seed tube has a vertically curved configuration. The configuration of the interior passageway is curved in a direction opposite the direction of movement of the seed metering device. The curved configuration of the seed pathway or passageway is such that the vertical and horizontal components of the seeds moving through the passageway are controlled such that the seed will eventually simply slide along the narrowed forward or front edge of the tube as it approaches the lower end from whence the seeds are discharged. The curvature of the tube, combined with the low coefficient of surface friction and the angularly diverging surfaces extending rearwardly from the front edge of the tube deadens seed bounce and allows the seeds to be discharged into the furrow with substantially equidistant spacing between the seeds.

These and other aims, objects and advantages of the present invention will be apparent from the following detailed description, appended claims, and the following drawings.

BRIEF DESCRIPTION OF THE DRAWINGS

FIG. 2 is an enlarged schematic side elevational view of a portion of the seed metering mechanism illustrated in FIG. 1 with parts broken away to show a rotatable disk of the seed metering mechanism that plucks individual seeds from a seed mass and then discharges the seeds from the seed metering apparatus into a seed tube of the present invention;

FIG. 3 is an enlarged schematic and side elevational view of the seed tube having a sensor mounted toward the lower end thereof;

FIG. 4 is a side elevational view of one form of a seed tube according to the present invention;

FIG. 5 is a front elevational view of the seed tube as schematically illustrated in FIG. 4;

FIG. 6 is a plan view of the seed tube schematically illustrated in FIG. 4;

FIG. 7 is a sectional view of the seed tube taken along line 7—7 of FIG. 4;

FIG. 8 is a sectional view taken along line 8—8 of FIG. 4;

FIG. 9 is a sectional view taken along line 9—9 of FIG. 4;

FIG. 10 is a rear view of the discharge area of the seed tube shown in FIG. 4;

FIG. 11 is an enlarged schematic sectional view of a lower area of the seed tube with a sensor arranged in operable association with the seed tube for detecting the passage of seeds through the seed tube;

FIG. 12 is an enlarged sectional view taken along line 12—12 of FIG. 3;

FIG. 13 is a view similar to FIG. 3 showing an alternative seed tube embodiment according to the present invention particularly suited for smaller size seeds and having a sensor secured to the lower end thereof;

FIG. 14 is a side elevational view of the seed tube schematically illustrated in FIG. 13;

FIG. 15 is a front elevational view of the seed tube schematically illustrated in FIG. 14;

FIG. 16 is a sectional view taken along line 16—16 of FIG. 14;

FIG. 17 is a sectional view taken along line 17—17 of FIG. 14;

FIG. 18 is a sectional view taken along line 18—18 of FIG. 14;

FIG. 19 is a rear elevational view of the discharge end of the alternative embodiment of seed tube schematically illustrated in FIG. 14; and FIG. 20 is sectional view of another alternative configuration of a seed tube according to the present invention.

DETAILED DESCRIPTION OF THE INVENTION

Figure 1:
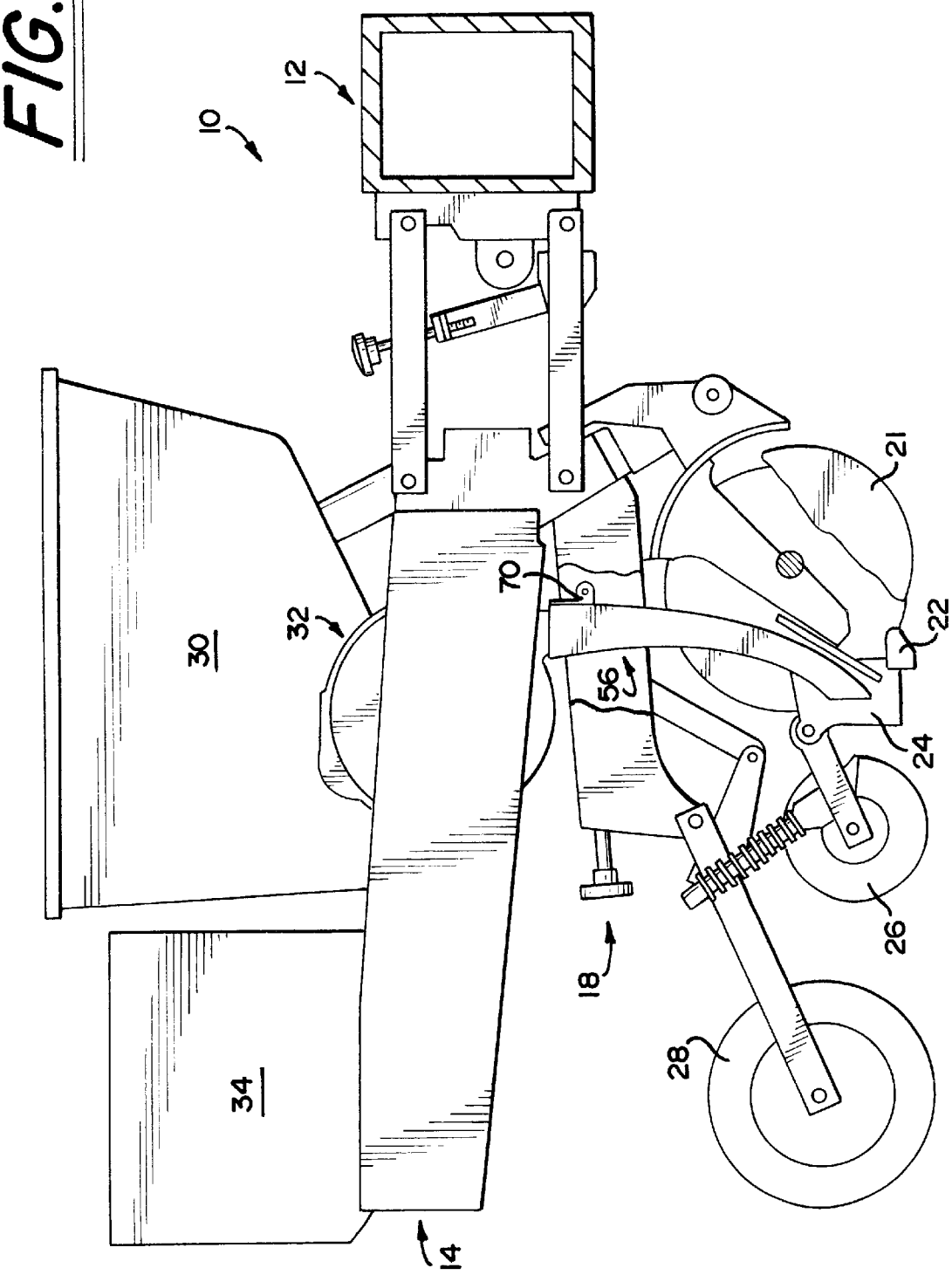
FIG. 1 is a schematic side elevational view of a planting unit with a seed tube in accordance with the present invention depending from a seed metering mechanism.

While the present invention is susceptible of embodiment in various forms, there is shown in the drawings and will hereinafter be described preferred embodiments of the invention with the understanding that the present disclosure is to be considered as setting forth exemplifications of the invention which are not intended to limit the invention to the specific embodiments illustrated.

Referring now to the drawings, wherein like reference numerals indicate like parts throughout the several views, an agricultural implement is schematically illustrated in FIG. 1 and is represented in its entirety by reference numeral 10. Implement 10 includes an elongated tool bar 12 which is supported for movement across and over fields by a plurality of wheels (not shown) and which is adapted to be towed in a given forward direction by a power source such as an off-highway tractor or the like. Attached to the tool bar 12 are a plurality of planting units 14; with only one planting unit being shown and described in detail and from which a complete understanding of the present invention may be determined. As is well known in the art, the planting units 14 are mounted in side-by-side relationship relative to each other along the length of the tool bar 12.

In the illustrated form, each planting unit 14 preferably includes a conventional furrow opening apparatus generally indicated in FIG. 1 by reference numeral 18. As is known in the art, the furrow opening unit 18 preferably includes a pair of laterally spaced furrow opener disks 21, a furrow forming point 22, and an opener shoe 24. The planting unit 14 further includes a pair of furrow closer disks 26 and a press wheel 28 arranged in fore-and-aft relationship relative to each other.

A seed hopper 30 is likewise carried on each planting unit 14. A seed metering mechanism or apparatus 32 is arranged in seed receiving relation relative to the hopper 30 and, in the illustrated embodiment, forms part of the planting unit 14. The purpose of the seed metering apparatus or mechanism 32 is to uniformly release seeds for deposit onto the ground.

As the power source or tractor pulls the tool bar 12 over the ground, in the given forward direction, the furrow opener apparatus 18 operates to open a furrow in the ground. Seeds from the seed hopper 30 flow into the seed metering mechanism 32 from whence seeds are deposited to the ground at a controlled rate. The furrow closer 26 trails the furrow opening apparatus 18 and, as the implement is drawn across the field, serves to close the furrow together and over the seeds dispensed by the seed metering mechanism 32 into the open furrow. The trailing press wheel 28 serves to compact the soil closed over the seeds In the illustrated embodiment, a pesticide hopper 34 is mounted toward a rear end of each planting unit 14 Hopper 34 preferably contains an insecticide and is provided with conventional dispensing means for applying controlled amounts of insecticide where desired in connection with the planting of seeds by each planting unit 14.

The seed metering mechanism or apparatus 32 is mounted to and movable with the hopper 30 in a conventional manner. Suffice it to say, and as shown in FIG. 2, the seed metering apparatus 32 includes a housing 38 mounted to be moved over the ground in a predetermined direction. In the illustrated embodiment, housing 38 includes a half shell 40 with a separating wall or baffle 42 and a cover 44. Cover 44 is of somewhat similar configuration to and is operably coupled in abutting relationship with the half shell 40 of housing 38. Housing 38 has a hollow interior that defines a seed reservoir 46 disposed to one side of separating wall or baffle 42 and wherein a mass of seeds, received from the seed hopper 30 are to be held. A rotary and apertured disk 48 is mounted within the hollow interior defined by the housing 38.

As is known in the art, disk 48 defines a series of seed holes or openings 50 circumferentially arranged in predetermined relation relative to each other and proximate to the periphery of the disk 48. Individual seeds from the seed reservoir 46 are drawn to and releasably held in each hole or opening 50 in the disk 48 by the effect of air pressure differential acting on the disk 48. More specifically, in the embodiment of seed metering mechanism illustrated, seeds are drawn to and releasably held in the holes or openings 50 defined by the disk 48 by the effects of an adjustable pressure from a vacuum source (not shown) coupled to the hollow interior of the housing 38.

The individual seeds are carried with the rotating disk 48 until they reach a seed discharge area 54 defined by housing 38 on the opposite side of the separating wall or baffle 42 and which is isolated from the reduced pressure within the interior of housing 38. As the holes or openings 50 move into the seed discharge area, the pressure differential acting on the disk 48 is closed off, resulting in equalization of air pressure acting on the disk 48 so that the seeds are no longer retained in the holes or openings 50 as a result of the pressure differential and gravity acting thereon and the seeds are released for discharge from the seed metering mechanism 32. Because the holes or openings 50 on the seed disk 48 are equidistantly spaced relative to each other, the seeds released from the disk 48 will have substantially equidistant spacings relative to each other as they pass or fall from the discharge area 54 of housing 38. Individual seeds are typically released from the disk 48 when each hole or opening 50 reaches approximately a "3 o'clock" position on the split housing 38.

A "3 o'clock" seed release position is generally preferred in seed metering mechanisms 32 of the type shown in FIGS. 1 and 2 because it allows the direction of seed to exit from the seed metering mechanism 32 to be aligned with the direction of gravitational pull. This provides for relatively uniform seed delivery within a wide range of possible rotational speeds of the seed disk 48.

For reasons known to those skilled in the art, and depending upon the particular manufacturer and other considerations, the seed discharge area 54 of a conventional seed metering mechanism or apparatus 32 is disposed above the ground surface a distance ranging between about 12 inches to about 24 inches The generally vertical release of individual seeds from the seed metering apparatus 32 would normally cause the individual seeds to gravitationally fall straight down to the ground below with a velocity, as mentioned above, that would cause the seeds to bounce upon ground engagement, resulting in nonuniform seed distribution. With the implement 10 being towed across the field in a given direction, a horizontal velocity component would likewise be imparted to the individual seeds discharged from the seed metering apparatus 32. This horizontal velocity component is likewise undesirable because of the nonuniformities in seed distribution that could result.

Consequently, and according to a first embodiment of the present invention shown in FIG. 3, a seed tube 56 is disposed between the seed discharge area 54 of each seed metering mechanism or apparatus 32 and extends closely proximate to the ground surface wherein seeds are to be deposited. According to this first embodiment of the present invention, and as shown in FIG. 3, the seed tube 56 preferably includes an elongated hollow member 58 defining an enclosed seed pathway 60. Member 58 has upper and lower ends 62 and 64, respectively. The upper end 62 of tube 56 defines an ingress area 66 to the passageway 60. As will be appreciated, the ingress area 66 is arranged in seed receiving relation with the seed metering apparatus 32. The lower end 64 of tube 56 defines an egress area 68 from whence seeds are deposited to the ground.

The enclosed seed pathway 60 and preferably tube member 58 has a vertically curved configuration between the upper and lower ends 62 and 64, respectively, of member 58 such that the ingress and egress areas 66 and 68, respectively, of the pathway 60 are disposed in different planes. The curved configuration of the pathway 60 extends rearwardly in a direction opposite the forward given direction of the seed metering apparatus 32. Preferably, and as shown in FIG. 19 the tube 56 further includes an apertured mounting lug 70 for mounting the tube 58 to the planting unit 14.

Tube 56 offers several distinct and different features for controlling the seeds as they move along the pathway 60. First, at least the interior surface of the enclosed passageway 60 has an extremely low coefficient of surface friction in the range of about 0.02 to about 0.10. In a most preferred form of the invention, the tube 56 is formed or molded from a molybdenum disulfide nylon filled material or similar material having a coefficient of surface friction in the above range, thus promoting gravitational movement of the seeds as they move along the pathway regardless of their size and/or shape. Second, the interior surface 62 of member 58 is specifically configured to minimize seed rattle or bounce therein so that control can be maintained over the metering of the seeds as they pass from the seed metering apparatus 32 to the ground.

As shown in FIGS. 4 and 5, the ingress opening 66 at the upper end 62 of member 58 preferably has a larger cross sectional area than does the egress opening 68 at the lower end 64 of member 58. Between its ends, and as will be appreciated from the schematic illustrations in FIGS. 4 through 9, the cross sectional area of the enclosed pathway 60 of the tube 56 smoothly changes as a function of the length of the tube. As such, and as the seeds move closer to the discharge opening 68 defined by tubular member 58, there is less area for the seeds to bounce and move as compared to the upper end of the seed tube 56.

Toward its upper end 62, and as shown in FIGS. 6 and 7, the enclosed passageway 60 is defined by a rear interior surface or wall 72, a pair of opposed side surfaces or walls 74 and 76 connected to and extending forwardly from the rear wall 72, and a front interior surface or wall 78 joined to each side wall 74 and 76. As will be appreciated from the schematic illustrations in FIGS. 6 and 7, the interior surfaces 72, 74, 76 and 78 smoothly converge or taper inwardly toward each other as the tube 56 extends from an upper end thereof whereby reducing the cross sectional area of the enclosed passageway 60 thus limiting the seed bounce and rattle as the seeds gravitationally move between opposite ends 62 and 66 thereof.

As shown in FIGS. 4, 7 and 8, the front wall 78 of the passageway 60 smoothly tapers and converges into a leading front or forward edge 80. Notably, the forward edge 80 of the interior passageway 60 is narrowed and generally centralized between the side surfaces 74, 76 of the seed pathway 60. The narrowed forward edge 80 extends upwardly from the lower end 66 and along the majority of the length of the passageway 60. Moreover, the front or forward edge 80 preferably follows the vertically curved configuration between the upper and lower ends 62 and 64 of member 58.

Turning to FIGS. 8, 9 and 10, along that portion of the pathway 60 including front edge 80, the interior of the pathway further includes slanted surfaces 82 and 84. The surfaces 82, 84 angularly diverge rearwardly in opposite directions relative to each other from the forward edge 80 and toward the rear wall or surface 72 of the interior of pathway 60 to form a "V" shaped configuration extending along a major lengthwise portion of the front edge 80. The surfaces 82 and 84 define an included angle therebetween and. in the illustrated embodiment, are integrally joined to and formed with the side surfaces 74 and 76. The included angle defined between the interior surfaces 82 and 84 of the passageway 76 ranges between about 60° and about 100°. In a most preferred form of the invention, the included angle defined between the surfaces 82 and 84 of the interior pathway 76 is about 90°.

The front or forward edge 80 of pathway 60, along with the surfaces 82 and 84 diverging rearwardly and angularly from edge 80, generally follow and parallel the vertically curved configuration of the tube 56 between the upper and lower ends 62 and 64, respectively. As such, and as shown in FIG. 4, the curved forward edge 80 and the surfaces 82, 84 (FIG. 8) extending rearwardly therefrom, curve in a direction opposite the given forward direction of the seed metering apparatus 32 and extend beneath and across, in a fore-and-aft direction, the width of the upper end 66 of passageway 60. Accordingly, as the individual seeds are released from the metering apparatus and gravitationally move through the passageway 60, they inescapingly engage and are controlled by the edge 80 and surfaces 82, 84 of the interior passageway 60. As will be appreciated, as the seeds gravitationally fall and engage surface 82 they will be positively directed by the slanted configuration thereof toward the narrowed and centered forward edge 80 of the pathway 60. Alternatively, as the individual seeds fall and engage surface 84 they likewise will be positively directed by the slanted configuration of surface 84 toward the narrowed and centered forward edge of the pathway 60.

Individual seed size varies depending upon the particular crop being planted. As shown in FIGS. 8 though 10, the front interior edge 80 of the pathway 60 has a curved configuration extending preferably along the entirety but at least along the majority of the length of the forward edge 80. The curved configuration extending along the forward interior edge 80 has a radius ranging between about 0.062 inches and about 0.562 inches. Moreover, the curved configuration of the interior edge 80 extends outwardly away from the pathway 60 and into planes of the diverging and angularly disposed surfaces 82 and 84 extending rearwardly from the front edge 80. The radial configuration of the forward edge 80 inhibits smaller seeds from becoming entrapped between the oppositely slanted surfaces 82 and 84.

Returning to FIG. 3, in a preferred form of the invention, the seed tube 56 has a conventional sensor or monitoring apparatus 86 arranged in operable combination therewith. As shown, the monitoring apparatus 86 is operably arranged in any suitable manner toward the lower end 66 of the tube 56 to provide a more accurate monitoring of the individual seeds passing through the passageway 60. In the illustrated embodiment, the sensor 86 is mounted on the front and rear sides of seed tube 56. In a most preferred from of the invention, the monitoring apparatus 86 is operably arranged relative to the tube 56 such that it is approximately 6 inches or less from the ground.

As shown in FIG. 11, the monitoring apparatus 86 is preferably comprised of a conventional photodetector including an electric light source 88 and an electric sensor or eye 90. As well known in the art, the photodetector is capable of producing output signals indicative of individual seeds passing between the light source 88 and the sensor or eye 90. The output signals are converted to a readout that is preferably provided to the operator in a cab region of the tractor (not shown) used to tow the implement 10 (FIG. 1) across the field.

As will be discussed in further detail below, the configuration of the interior surfaces defining the enclosed passage 60 of tube 56 are such that individual seeds have a tendency and likelihood to slide along the narrowed front edge 80 between the slanted oppositely directed surfaces 82, 84 extending rearwardly from the front edge 80. Accordingly, it is most beneficial to position the monitoring apparatus where it has the greatest likelihood of detecting individual seed passing along the passage 60. In this regard, and turning now to FIG. 12, in a most preferred form, the sensor or eye 90 is arranged in operable combination with the front edge 80 and the interior surfaces 82, 84 of the pathway 60. So as to not interfere with and, thus, reduce the likelihood of imparting seed rattle or bounce to the seeds passing along the interior surfaces of passage 60, at least that end portion of the photodetector component arranged in operable combination with the front edge 80 of the enclosed passage 60 has a surface configuration that corresponds to is substantially similar to the configuration of the front or forward edge 80 defining a portion of the pathway 60.

Another embodiment of the seed tube is schematically illustrated in FIGS. 13 through 19 and is generally designated therein by reference numeral 156. The seed tube 156 is similar, and functions in a similar manner, to the first embodiment of the seed tube 56 described above with reference to FIGS. 3 through 12. This particular embodiment of the seed tube is designed for handling smaller size seeds. The elements of this alternative embodiment of seed tube 156 that are identical or functionally analogous to those of the first embodiment 56 are designated with reference numerals identical to those used for the first embodiment with the exception that this alternative embodiment reference numerals are in the one-hundred series.

As shown in FIGS. 13 and 14, the seed tube 156 includes a hollow member 158 having an elongated configuration. Member 158 defines an enclosed seed passageway 160 that is vertically curved between opposite ends 162 and 164 of member 158. Notably, and as with passageway 60 of member 58, the cross-sectional area of the passageway 160 defined by member 158 decreases between ingress and egress ends 166 and 168, respectively, of passageway 160. Moreover, the curved configuration of the pathway 160 extends rearwardly in a direction opposite to the given forward direction of the seed metering apparatus 32 (FIG. 1). Intermediate the ends thereof, member 158 includes a mounting lug 170 for facilitating releasable attachment of tube 156 to the planting unit 14 (FIG. 1).

To facilitate gravitational movement of the individual seeds from the seed metering mechanism 32 toward the outlet end 164 of tube 156, at least the interior surface of the enclosed passageway 160 has an extremely low coefficient of surface friction in the range of about 0.02 to about 0.10.

As with tube 56, tube 156 is preferably molded or formed from a molybdenum disulfide nylon filled material or similar material having a coefficient of surface friction in the above range.

As shown in FIGS. 14 through 16, toward its upper end the enclosed passageway 160 is defined by a rear interior surface or wall 172, a pair of opposed side surfaces or walls 174 and 176 connected to and extending forwardly from the rear wall 172, and a front wall 178 joined to each side wall 174 and 176. The interior surfaces 172, 174, 176 and 178 smoothly converge or taper inwardly toward each other to decrease the cross-sectional configuration of the pathway 160 between upper and lower ends 162 and 164 of tube 156.

As shown in FIG. 15, and as will be appreciated from a comparison of FIGS. 16 and 17, the front wall or interior surface 178 of the enclosed passageway 160 smoothly tapers and converges into a narrowed leading or forward edge 180. Notably, the forward edge 180 extends along the majority length of the passageway 160 and is generally centralized between the interior surfaces 174 and 176 of the seed passageway 160.

As shown in FIGS. 17 and 18, along that portion of the enclosed passageway 160 including the front edge 180, the interior of the pathway further defines interior surfaces 182 and 184. As shown, surfaces 182 and 184 angularly diverge rearwardly in opposite directions relative to each other from the narrowed forward edge 180 and toward the rear surface or wall 172 of the interior of the passageway 160 to provide a major lengthwise portion of the front edge 180 with a generally "V" shaped configuration. Notably, the angularly diverging rear surfaces 182 and 184, toward their rear ends are, preferably, joined to the side surfaces 174 and 176 of the interior surface of the passageway 160. The angularly diverging interior surfaces 182 and 184 define an included angle ranging between about 60° and about 135° therebetween.

As shown in FIGS. 13 and 15, the curved forward edge 180 and the surfaces 182 and 184 extending rearwardly therefrom, curve in a direction opposite from the given forward direction of the seed metering apparatus 32 (FIG. 1). Moreover, between the vertically spaced ends of member 158, the forward edge 180 and surfaces 182 and 184 extend beneath and across, in a fore-and-aft direction, the width of the upper end of the member 158. Accordingly, as the individual seeds are released from the seed metering apparatus 32 and gravitationally move through the passageway 160, the seeds inescapingly engage and are controlled by the edge 180 and the surfaces 182, 184 of the interior passageway 160.

As shown in FIGS. 17 and 19, the discharge end 164 of tube member 158 has a relative short length. That portion of tube member 158 extending upwardly from the discharge end 164 has a generally circular outer surface configuration. The interior surface of tube member 158 defined by side surfaces 174, 176, and the front edge 180 with the angularly diverging surfaces 182 and 184 extending therefrom, all smoothly converge into the crosssectional shape illustrated in FIG. 19. Notably, the interior of surfaces 182, 184 combine to define a "V" shaped configuration extending along the front edge 180 preferably to the discharge end 164 of tube member 158. As such, there are no surfaces or edges spaced along the length of the interior surface of the seed pathway 160 that would tend to impart bounce or rattle to the individual seeds moving between opposite ends of the tube 156.

The outer surface configuration at the discharge end 164 of tube 156 furthermore promotes the releasable attachment of a conventional output signal producing monitoring apparatus or sensor 186 in operable association with the discharge end of tube 156. As mentioned above, arranging the monitoring apparatus 186 closer to the ground is better suited to monitor the passage of seeds through the tube 156.

Still another embodiment of the seed tube is schematically illustrated in FIG. 20 and is generally designated therein by reference numeral 256. The seed tube 256 preferably has an hollow elongated configuration substantially similar to that schematically illustrated in FIGS. 4 or 14. The seed tube 156 is intended to function in a manner similar to either of the two embodiments discussed above. Suffice it to say, the seed tube 256 has a vertically curved configuration between opposite ends thereof. The curved configuration of tube 256 is in a direction opposite to the given forward direction of the seed metering apparatus 32 (FIG. 1).

Seed tube 256 further defines an enclosed passageway 260 for guiding and controlling individual seeds as they gravitationally move between opposite ends of the tube 256. Similar to the above-described embodiments of the invention, and to facilitate gravitational movement of the individual seeds, the interior surface of the enclosed passageway 260 has an extremely low coefficient of surface friction in the range of about 0.02 to about 0.06. As with the other embodiments of the present invention, tube 256 is preferably formed from a molybdenum disulfide nylon filled material with a PTFE friction modifier added thereto sold under the tradename "Nylatron GS" or similar material as long as the chosen material has a coefficient of surface friction in the preferred range mentioned above and has an anti-bounce or "deadening" characteristic thereto.

The tube 256 is characterized by the enclosed passageway 260 having a configuration that promotes controlled delivery of individual seeds with minimum bounce and rattle as they move between opposite end of the tube 256. In the illustrated embodiment of the invention, and toward the upper end, the enclosed seed pathway 260 defined by tube 256 has a generally rectangular cross-sectional configuration similar to that schematically illustrated in FIGS. 6 and 7. To enhance control over the individual seeds as they pass between opposite ends of the tube 256, the rectangular cross-section of the seed pathway 260 smoothly and gently transforms to an elliptical cross-sectional configuration as shown in FIG. 20.

As will be appreciated, from the upper location where the rectangular cross-section of the seed pathway transforms to an elliptical cross-sectional configuration and the discharge end of the tube 256, the elliptical cross-section of the seed pathway continues to decrease thereby providing less and less space for the seeds to bounce and move or rattle as they move along the pathway 260. As shown in FIG. 20, the elliptically shaped pathway 260 has interior surfaces 274 and 276 extending in opposite angular directions away from a narrowed forward or leading edge 280. As in the other embodiments of the invention discussed above, the front edge 280 of the seed pathway curves upwardly from beneath and, in a fore and aft direction, crosses the open inlet or egress end to the pathway 260. As the seeds progress downwardly through the pathway, if they do not slide along the front edge 280, the side interior surfaces 274 and 276 tend to positively impart at least a component of movement tending to cause the seeds to move toward the front edge 280 and thereby reduce the rattle and bounce of the seeds.

Since the various embodiments of the present invention operate in a substantially similar manner relative to each other, only a summary of the unique characteristics of seed tube 56 will be discussed in detail with the understanding that the other seed tubes and their own individual unique characteristics are intended to be encompassed within the spirit and scope of the present invention. It was previously noted that the seeds are released with substantially equal spacing therebetween from the disk 48 of the seed metering apparatus 32 at essentially the "3 o'clock" position considering the rotary path of the disk 48. As such, the mean direction of the seeds released from the seed metering mechanism is essentially vertically downward.

Forming the seed tube of the present invention from any of a class of materials including a nylon 6/6 with a PTFE friction modifier added thereto and sold under the tradename "Nylatron GS" or a bay resin with a PA111 additive added thereto or other suitable material advantageously provides the interior surface of the enclosed seed passageway 60 with a coefficient of surface friction ranging between about 0.02 and about 0.10. Accordingly, and regardless of the shape or size of the individual seeds moving along the pathway 60, the result is that the initial contact of the individual seeds released and falling from the seed metering apparatus 32 with the interior surface of the seed pathway will have less bounce or rattle than heretofore known Testing using high speed photography, conventional monitoring systems and seed space analyzers has revealed that the extremely low coefficient of surface friction provided along the interior seed contacting surfaces of the seed pathway causes the individual seeds to slide relative to the contacting surface of the pathway rather than bounce or rattle upon contact and produces what may be best described as a "deadening" or anti-bounce characteristic. Additionally, the extremely low coefficient of surface friction allows the seeds to slide along the interior surface of the tube without effecting the speed with which the seeds move as they pass between opposite ends of the tube. As will be appreciated by those skilled in the art, deadening the seed by substantially eliminating seed rattle and bounce within the tube results in a generally uniform time it takes for each individual seed to progress between the ingress and egress ends of the pathway thereby enhancing equidistant spacing between adjacent seeds during the planting operation.

The downwardly curved configuration of the interior surface of the seed passageway 60 furthermore serves to reduce seed rattle and bounce as the individual seeds gravitationally move between opposite ends and through the tube 56. The rearwardly curved configuration of the interior surface of the seed pathway tends to nullify the component of horizontal movement imparted to the seeds as a result of the forward movement of the implement in a given forward direction Moreover, the rearwardly and downwardly curved configuration of the interior surface of tube 56 tends to minimize the angle of incidence of seed contact with the interior surface of the seed pathway 60.

As schematically illustrated in FIG. 3, a dash line 57 represents the mean path of seeds released from the seed metering mechanism 32. Upon release from the seed metering mechanism 32, seeds tend to fall essentially vertically downward through the ingress end 66 of the tube 56 and into initial contact with the interior surface of the seed pathway 60. Because of the curvature of the interior surface of the pathway 60 (and partially because of the significantly lowered coefficient of surface friction), the angle of incidence established between the path of the falling seed and the vertical slant of the interior surface is relatively small. As will be appreciated by those skilled in the art, the continuous rearward and vertically slanted curvature of the interior surface of the pathway 60 tends to further reduce the angle of incidence established between the seed contact and the interior surface of the pathway thus furthermore reducing the seed rattle and bounce as the individual seeds gravitationally travel along the pathway 60.

Configuring the seed tube with a narrowed front edge 80 extending upwardly from the discharge end 68 of the tube 56 and along the majority length of the enclosed pathway 60 furthermore serves to reduce seed rattle and bounce as the seeds move along the pathway 60 thus promoting control over the seeds gravitationally moving along the pathway and thereby promoting the ability to effect equidistant spacings between adjacent seeds planted in the furrows. According to the present invention, the narrowed front edge 80 extends beneath and across, in a fore-and-aft direction, the ingress end 66 of the seed tube thus yielding further control over the gravitationally moving seeds as they pass between opposite ends of the seed tube. The angularly diverging surfaces 82, 84 rearwardly extending from the front edge 80 furthermore serve to positively direct the seeds toward a predetermined path of movement while minimizing seed bounce and rattle as the seeds move along the pathway. Because the narrowed front edge 80 is generally centralized in a lateral direction relative to the pathway, the discharge of seeds from the tube 56 tends to remain constant thus yielding predictable and generally uniform discharge or dispensing of the seeds into the furrow in the ground Moreover providing at least the interior surface configuration of the tube with an extremely low coefficient of contact surface friction allows the seeds, regardless of their size or configuration, to move along and contact the interior surface with no appreciable loss in speed as they move between increase and egress ends of the tube.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A seed metering apparatus comprising, in combination, a housing mounted to be moved over ground in a predetermined direction and having a hollow interior defining a hopper area wherein seeds are held, a rotary and apertured disk mounted within the hollow interior of said housing for conveying seeds from said hopper area to a seed discharge area under the influence of pressure differentials acting on said disk, and wherein the pressure differentials are blocked from acting on said disk in the region of said seed discharge area such that seeds are periodically released from said disk within the seed discharge area of the housing for deposit to the ground, and an elongated seed tube having an upper end arranged in a generally vertical orientation and in seed receiving relation relative to the seed discharge area of the housing and a lower end from which seeds are gravitationally discharged, said seed tube having an elongated and closed passageway including an internal surface defining a vertically disposed and narrowed front edge extending beneath and across, in a fore-and-aft direction, the width of the upper end of said passageway, said front edge further extending upwardly from a lower end of said tube and along the majority length of said tube with surfaces extending transversely away from and angularly diverging rearwardly in opposite directions relative to each other from said front edge toward a rear surface such that seeds discharged from said housing into said tube are positively directed and controlled thereby enhancing their delivery with predetermined spacing relative to each other as they are deposited onto the ground.

2. The seed metering apparatus according to claim 1 wherein said passageway has a changing cross-sectional area between upper and lower ends of said tube.

3. The seed metering apparatus according to claim 1 wherein the surfaces angularly diverging rearwardly in opposite directions relative to each other from said front edge define a "V" shaped configuration having an included angle ranging between about 60° and about 135° between the angularly diverging surfaces.

4. The seed metering apparatus according to claim 1 wherein at least the front edge and the surfaces diverging rearwardly and in opposite angular directions relative to each other for at least a portion of the length of the closed passageway have a seed engaging surface having a coefficient of friction ranging between about 0.02 and about 0.10 to facilitate delivery of seeds between upper and lower ends of said tube.

5. The seed metering apparatus according to claim 1 wherein said seed tube has a vertically curved configuration between opposite ends of said tube.

6. The seed metering apparatus according to claim 1 wherein said seed metering tube is formed from a molybdenum disulfide filled nylon material to facilitate delivery of seeds between upper and lower ends of said tube thereby enhancing seed deposit on the ground.

7. The seed metering apparatus according to claim 1 wherein said front edge has a curvature extending along the majority of the length thereof, said curvature having a radius ranging between about 0.062 inches and about 0.562 inches, and wherein said curvature extends outwardly away from said passageway and into planes of the diverging and angularly disposed surfaces extending rearwardly from said front edge.

8. The seed metering apparatus according to claim 1 further including a sensor apparatus mounted between the upper and lower ends of said seed tube for monitoring the passage of seeds along said passageway.

9. The seed metering apparatus according to claim 8 wherein said sensor apparatus comprises a photodetector including a light emitting source and an eye that receives light from said light emitting source.

10. The seed metering apparatus according to claim 9 wherein the eye of said photodetector is mounted to extend through the front edge of said tube, and wherein the eye of said photodetector has a face that is configured to complement the internal surface of said closed passageway to substantially eliminate any interference with seeds passing thereover.

11. The seed tube according to claim 9 wherein said seed tube is formed from a molybdenum disulfide filled nylon material to facilitate delivery of seeds between upper and lower ends of said tube thereby enhancing seed deposit on the ground.

* * * * *